United States Patent [19]

Ohmori

[11] Patent Number: 4,728,989
[45] Date of Patent: Mar. 1, 1988

[54] ELECTROSTATIC LATENT IMAGE FORMING APPARATUS USING SEMICONDUCTOR LASER

[75] Inventor: Naoto Ohmori, Toyokawa, Japan

[73] Assignee: Minolta Camera Kabushiki Kaisha, Osaka, Japan

[21] Appl. No.: 13,483

[22] Filed: Feb. 11, 1987

[30] Foreign Application Priority Data

Feb. 14, 1986 [JP] Japan .................. 61-31580

[51] Int. Cl.[4] .............................. G03G 15/00
[52] U.S. Cl. .................. 355/14 R; 355/3 R; 355/8; 346/76 L; 346/153.1
[58] Field of Search .............. 355/14 R, 8, 3 R, 1; 346/76 L, 153.1, 155; 358/296, 300

[56] References Cited

U.S. PATENT DOCUMENTS 4,552,449 11/1985 Wakamatsu et al. ......... 355/14 R X
4,563,081 1/1986 Sato ................. 355/14 R X
4,578,689 3/1986 Spencer et al. ............. 355/3 R X
4,589,764 5/1986 Tadokoro et al. ............. 355/14 R
4,641,200 2/1987 Shoji et al. .................. 355/3 R X

FOREIGN PATENT DOCUMENTS 57-23914 2/1982 Japan .
59-146017 8/1984 Japan .
60-170280 7/1985 Japan .

Primary Examiner—A. C. Prescott
Attorney, Agent, or Firm—Price, Gess & Ubell

[57] ABSTRACT

An electrostatic latent image forming apparatus using a semiconductor laser 11 forms an image on a surface of a photoreceptor drum 15 by a laser beam modulated by an image signal while intensity of the laser beam is lowered by a reflection mirror 16 having a reflectance as low as 30%. The semiconductor laser 11 is driven by current obtained by adding bias current Iba to switching current Isw and a bias component out of an optical output level thereof is decreased by the reflection mirror 16 having the low reflectance. Therefore, an off-level optical output correponding to the bias current becomes lower than that in the case in which lowering of the intensity of the beam is not caused, and as a result, a "fogging" phenomenon or the like can be effectively prevented.

14 Claims, 5 Drawing Figures

ELECTROSTATIC LATENT IMAGE FORMING APPARATUS USING SEMICONDUCTOR LASER

BACKGROUND OF THE INVENTION

1. Field of the Invention

The present invention relates to an apparatus for forming an electrostatic latent image on a surface of a photoreceptor by using a semiconductor laser beam modulated by an image signal, and more particularly to an electrostatic latent image forming apparatus of a type in which bias current is added to current for exciting a semiconductor laser.

2. Description of the Prior Art

A so-called electrographic process in which an electrostatic latent image formed on a photoreceptor is developed by toner and transferred on paper is conventionally utilized as a printing technique in a copying machine, a printer or the like. As an apparatus for forming such an electrostatic latent image, there is known an apparatus in which a laser beam modulated by an image signal obtained by exposure and scanning of an image of a document is applied to a photoreceptor to form an electrostatic latent image on the surface of the photoreceptor. According to a proposal in the prior art, such an apparatus comprises a temperature compensating circuit.

FIG. 1 is a graph showing optical output and forward current characteristics (referred to hereinafter as P-I characteristics) of a semiconductor laser used for such an electrostatic latent image forming apparatus. In FIG. 1, the abscissa represents forward current (I) and the ordinate represents optical output (P).

As can be seen from FIG. 1, the P-I characteristics of the semiconductor laser show a sharp rise with respect to a certain current value as a boundary value which is varied according to the ambient temperature. In other words, the P-I characteristics of the semiconductor laser show parallel movements in the direction of the axis I according to the change of the ambient temperature. Thus, the optical output of the semiconductor laser changes largely dependent on the change of the temperature, causing a disturbance to image data.

FIG. 2 is a block diagram showing an automatic power control (APC) circuit proposed for the purpose of compensating for such change of optical output due to temperature change. Such an APC circuit is disclosed in detail for example in Japanese Laid-Open Patent application No. 170280/1985.

First, configuration of the APC circuit shown in FIG. 2 will be described.

Referring to FIG. 2, a switching portion 1 generates signal current or switching current Isw for modulating a laser beam in response to an image signal applied from a microcomputer M/C (not shown) so that the signal current or the switching current Isw is applied to a semiconductor laser L.D. An optical output level of the semiconductor laser L.D driven by the signal current is detected by a photodiode P.D and fed back to an APC portion 2. The APC portion 2 generates bias current Iba and adds it to the signal current Isw so that the optical output level of the semiconductor laser L.D may be constant. More specifically, the semiconductor laser L.D is driven by current Iop obtained by adding the bias current Iba to the signal current Isw.

Referring to FIG. 3, the operation principle of the APC circuit shown in FIG. 2 will be described. The upper half portion of FIG. 3 is a graph showing P-I characteristics of the semiconductor laser in the same manner as in FIG. 1 where the abscissa represents forward current (Iop) and the ordinate represents optical output (P). In FIG. 3, the optical output level Ps is a level corresponding to sensitivity of a photoreceptor, where an electrostatic latent image can be formed. More specifically, if a laser beam of an output level higher than the level Ps is applied to the photoreceptor, the potential at the incident point on the surface of the photoreceptor is sufficient to permit development by the toner (adhesion of the toner). On the contrary, if a laser beam of an output level lower than the level Ps is applied to the photoreceptor, the potential at the incident point on the photoreceptor is not sufficient for adhesion of the toner.

In this case, as shown in FIG. 3, the optical output level P1 (P1>Ps) is adopted as an "on-level" signal of the optical output, which means an optical output level causing the potential of the incident point of the laser beam on the photoreceptor to be lowered to a level where the toner can be adhered.

In FIG. 3, if a case of the ambient temperature at 10° C. is considered, a current value I10 necessary for obtaining the above mentioned on-level optical output P1 is as follows.

$$I10 = Isw + Iba \qquad (1)$$

Similarly, a current value I25 necessary for obtaining P1 at temperature 25° C. is as follows.

$$I25 = Isw + Iba' \qquad (2)$$

In addition, a current value I50 necessary for obtaining P1 at temperature 50° C. is as follows.

$$I50 = Isw + Iba'' \qquad (3)$$

In other words, current of Iba at temperature 10° C., current of Iba' at temperature 25° C. and current of Iba" at temperature 50° C. are respectively added, as the bias current, to the switching current Isw so that the constant on-level optical output P1 can be obtained irrespective of the change in the temperature.

As a conventional electrostatic latent image forming apparatus, there is known an apparatus in which a beam attenuation filter is disposed between a laser beam generator and a photoreceptor. Such an apparatus is disclosed for example in Japanese Laid-Open Patent application No. 23914/1982 or 146017/1984. Such a beam attenuation filter is provided for the below described reason. A conventional apparatus generally comprises an SOS (start-of-scan) sensor for defining a printing start position and it is necessary to apply sufficient intensity of light to this sensor for rapid response. However, if a too intense beam is applied to the photoreceptor having high sensitivity, there are caused unfavorable effects such as deterioration of the sensitivity or damage of the photoreceptor. Therefore, a beam attenuation filter is disposed in a light path between the laser beam generator and the photoreceptor except for a light path for the SOS sensor so as to solve the above described incompatible problem. However, it is to be noted that those known techniques make no disclosure as to application of bias current to signal current for the purpose of assuring a constant optical output level as described above.

Returning again to the circuit in FIG. 2, if the switching current is cut off, namely, Isw=0, the optical output level PO is as follows.

$$PO \neq 0 \qquad (4)$$

More specifically, even if the switching current is cut off (Isw=0), the optical output level PO is not completely equal to 0 because of the above described bias current (Iba at 10° C., Iba' at 25° C. and Iba" at 50° C.) and a weak optical output is generated.

Such a weak optical output PO is as follows.

$$PO < Ps \qquad (5)$$

Thus, the optical output PO is in an "off-level" region, which means a region of an optical output level where the potential of the incident point of the laser beam on the photoreceptor is not sufficient to a level enabling adhesion of the toner.

However, there is any probability of adhering the toner at a boundary between the on-level region and the off-level region and even in the off-level region, although this probability is of a low degree according to the optical output of the bias current.

As a result, by adhesion of the toner occurring with such a low probability, a small amount of the toner uniformly adheres even in a range which should be white on a reproduced image, causing a so-called "fogging" phenomenon.

In addition, if a copying machine is in a wait state or in a state of initialization or the like, the above mentioned weak optical output continues to be applied to a specified region of the photoreceptor, resulting in optical fatigue.

Furthermore, such application of bias current is effected not only for the above described purpose of temperature compensation but also for the purpose of improving switching characteristics of the semiconductor laser and similar problems also occur for the latter purpose.

SUMMARY OF THE INVENTION

Briefly stated, the present invention is an electrostatic latent image forming apparatus comprising: a semiconductor laser; drive means for adding bias current to switching current modulated by an image signal, thereby to apply the current obtained by the addition to the semiconductor laser to excite it so that a laser beam is emitted; a photoreceptor having a surface where an electrostatic latent image is to be formed by the laser beam; a scanning optical system for scanning the surface of the photoreceptor by the laser beam emitted from the semiconductor laser and forming the image thereon; and optical means disposed in a path of transmission of the laser beam from the semiconductor laser to the photoreceptor for lowering the intensity of the laser beam to decrease a component corresponding to the bias current out of the laser beam.

According to another aspect of the present invention, the above stated optical means is a mirror of a low reflectance.

According to a further aspect of the present invention, the reflectance of the mirror is in a range from 20 to 60%.

According to a still further aspect of the present invention, the above stated optical means is a neutral density filter having a low transmittance.

According to a still further aspect of the present invention, the transmittance of the above stated filter is in a range from 20 to 60%.

Therefore, a principal object of the present invention is to provide an electrostatic latent image forming apparatus capable of preventing, during the existence of bias current, unfavorable effects such as a "fogging" phenomenon or optical fatigue of the photoreceptor caused by the bias current.

A principal advantage of the present invention is that by decreasing an optical output component (referred to hereinafter as a bias component) generated by bias current out of the whole optical output, an optical output level at cutoff of switching current can be lowered without decreasing the bias current value.

Another advantage of the present invention is that such functions by the bias component as compensation of any change of optical output due to temperature change or improvement of switching characteristics of the semiconductor laser can never be affected unfavorably.

These objects and other objects, features, aspects and advantages of the present invention will become more apparent from the following detailed description of the present invention when taken in conjunction with the accompanying drawings.

BRIEF DESCRIPTION OF THE PREFERRED EMBODIMENTS

Figure 4:
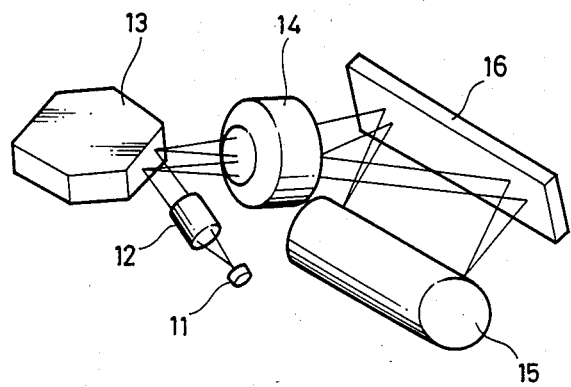
FIG. 4 is a typical perspective view showing construction of an electrostatic latent image forming apparatus of an embodiment of the present invention.

FIG. 4 is a typical perspective view showing construction of an electrostatic latent image forming apparatus of an embodiment of the present invention.

First, the construction of the embodiment shown in FIG. 4 will be described.

Figure 2:
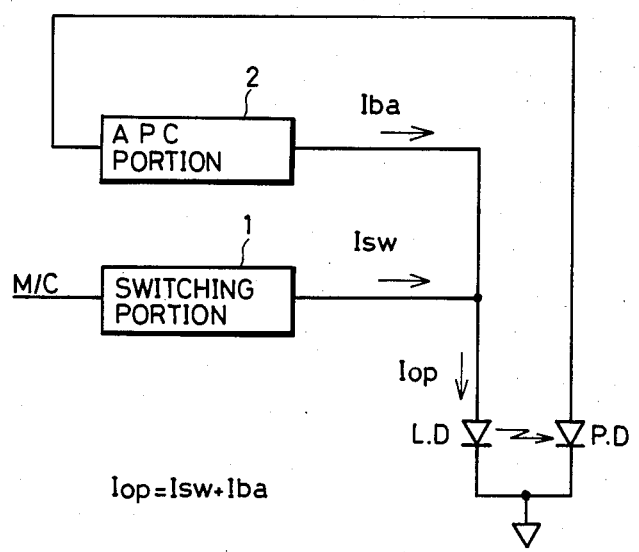
FIG. 2 is a block diagram showing an automatic power control (APC) circuit for compensating the change of optical output due to temperature change.
Figure 3:
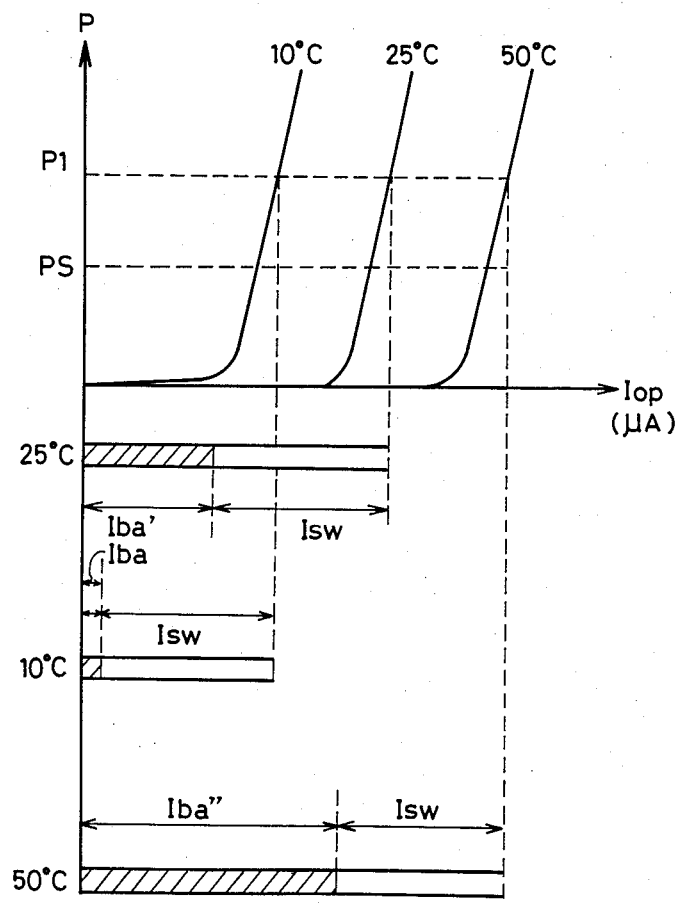
FIG. 3 is a graph for explaining operation of the APC circuit shown in FIG. 2.

Referring to FIG. 4, a semiconductor laser 11 is driven by the APC circuit shown in FIG. 2 so that a laser beam modulated by an image signal is emitted. The beam emitted from the semiconductor laser 11 is caused to be a parallel beam through a collimator lens 12 and then it is applied to a polygon mirror 13. The polygon mirror 13, while rotating rapidly, reflects the parallel beam applied from the collimator lens 12 so that the reflected beam is applied to an f·θ lens 14. The f·θ lens 14 converges the reflected light from the polygon mirror 13 and applies the converged beam to a reflection mirror 16 having a low reflectance. The reflection mirror 16 reflects the beam from the f·θ lens 14 by lowering the intensity thereof so that an image is formed on the surface of the photoreceptor drum 15.

In the embodiment shown in FIG. 4, the semiconductor laser 11, the collimator lens 12, the polygon mirror 13, the f·θ lens 14 and the photoreceptor drum 15 are the same as in the conventional apparatus.

On the other hand, the reflection mirror 16 has a considerable low reflectance, i.e. 30% as is different from the mirror of the conventional apparatus having the reflectance of 90% or more.

Figure 1:
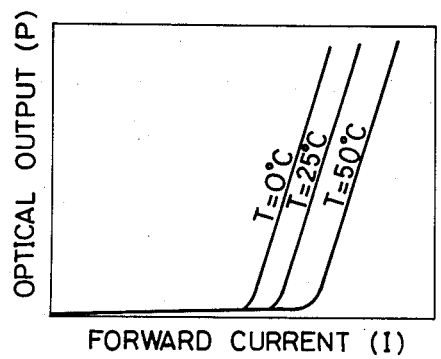
FIG. 1 is a graph showing P-I characteristics of a semiconductor laser used in an electrostatic latent image forming apparatus.
Figure 5:
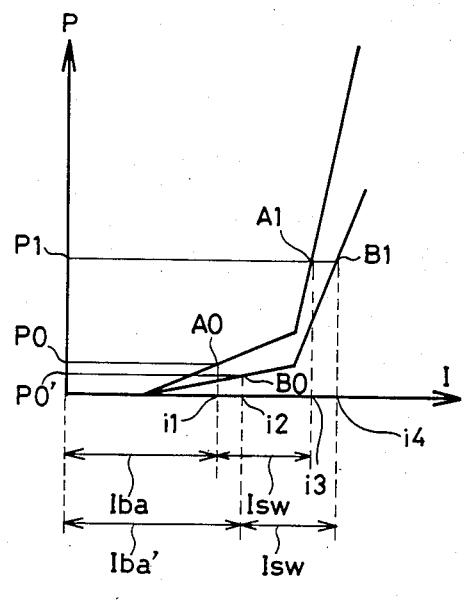
FIG. 5 is a graph for explaining operation of the embodiment shown in FIG. 4.

FIG. 5 is a graph for explaining operation of the embodiment shown in FIG. 4, which shows, in an enlarged manner, the rising portion of the P-I characteristics of the semiconductor laser as shown in FIG. 1 for example.

Referring to FIGS. 4 and 5, the operation of this embodiment will be described.

In FIG. 5, the abscissa represents forward current (I) and the ordinate represents optical output (P). In this figure, "A" shows the conventional case in which intensity of the beam is not lowered and "B" shows the case of the present invention in which intensity of the beam is uniformly lowered by the reflection mirror 16 having low reflectance.

Referring to FIG. 5, in the case A, an on-level optical output P1 and an off-level optical output P0 are obtained at the point A1 (i3, P1) and at the point A0 (i1, P0), respectively. On the other hand, in the case B, an on-level optical output P1 and an off-level optical output P0' are obtained at the point B1 (i4, P1) and at the point B0 (i2, P0'), respectively. More specifically, if the on-level optical output has the same value (P1) in the cases A and B, the off-level outputs are in a relation of A>B (P0>P0'). In other words, if the light intensity is lowered, only the off-level optical output P0 can be lowered without lowering the on-level optical output P1.

More specifically, if the initial surface potential V0 of the photoreceptor is 500 V and the development bias voltage VB is 400 V, a voltage drop of 80 V is caused by the off-level output and V0 becomes 420 V in the conventional apparatus, while, if the reflection mirror 16 having a reflectance 30% in this embodiment is used, the initial surface potential V0 is 480 V and a wide margin for prevention of fogging is allowed with respect to the development bias potential BV=400 V. As a result, the "fogging" phenomenon can be effectively prevented.

In a copying machine comprising an electrostatic latent image forming apparatus of this embodiment, when the copying machine is in a wait state or when initialization is being effected in the copying machine, the optical output of the bias component does not continue to be applied to the photoreceptor and, thus, optical fatigue of the photoreceptor can be prevented and the lifetime thereof can be lengthened.

In the above described embodiment, the light intensity lowering means is implemented by decreasing the reflectance of the reflection mirror conventionally used for making the apparatus compact and accordingly the number of components is not increased.

Although the mirror having the reflectance 30% is used in the above described embodiment, any suitable mirror may be used if it has a reflectance in a range from 20 to 60%.

As another example of the light intensity lowering means, a neutral density filter capable of uniformly lowering light intensity independent of wavelength may be utilized. In this case also, it is desired that the transmittance of the neutral density filter be in a range from 20 to 60%.

In the above described embodiment, in order to maintain the on-level optical output at the same level P1 as in the conventional apparatus, bias current is increased from i1 to i2. In other words, the switching current Isw is not changed. This is for the purpose of not changing the rising characteristics at the time of switching. Therefore, if no influence is caused in the rising characteristics at the time of switching, the switching current may be increased without changing the bias current.

Although no mention is made of the location of the SOS sensor in the above described embodiment, this sensor is preferably located at a position coming before the position where the optical output level is lowered.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrostatic latent image forming apparatus comprising:
   a semiconductor laser,
   drive means for adding bias current to switching current modulated by an image signal and applying the current obtained of the addition to said semiconductor laser, thereby to excite said semiconductor laser to emit a laser beam,
   a photoreceptor having a surface on which an electrostatic latent image is to be formed by said laser beam,
   a scanning optical system for scanning said surface of said photoreceptor by said laser beam emitted from said semiconductor laser and forming an image by said laser beam on said surface of said photoreceptor, and
   optical means disposed in a path of transmission of said laser beam extending from said semiconductor laser to said photoreceptor for lowering intensity of said laser beam, thereby to decrease a component corresponding to said bias current out of said laser beam.

2. An electrostatic latent image forming apparatus in accordance with claim 1, wherein
   said optical means is a mirror having a low reflectance.

3. An electrostatic latent image forming apparatus in accordance with claim 2, wherein
   said mirror having the low reflectance is disposed to bend said path of transmission of said laser beam.

4. An electrostatic latent image forming apparatus in accordance with claim 3, wherein
   the reflectance of said mirror is in a range from 20 to 60%.

5. An electrostatic latent image forming apparatus in accordance with claim 1, wherein
   said optical means is a neutral density filter having a low transmittance.

6. An electrostatic latent image forming apparatus in accordance with claim 5, wherein
   the transmittance of said filter is in a range from 20 to 60%.

7. An electrostatic latent image forming apparatus in accordance with claim 1, wherein
   said drive means comprises:
   a switching portion for generating switching current in response to said image signal, and
   a bias portion for generating bias current to be added to said switching current.

8. An electrostatic latent image forming apparatus in accordance with claim 7, wherein said bias portion comprises:
  a light receiving element for receiving the laser beam emitted from said semiconductor laser, and
  an automatic power control circuit for controlling said bias current according to the beam received by said light receiving element.

9. An improved electrostatic latent image forming apparatus comprising:
  laser means for providing a laser beam;
  drive means for exciting the laser means to emit a laser beam capable of forming a latent image;
  means for compensating for the effect of any temperature variations on the output of the laser beam;
  a photoreceptor for forming the latent image from the impact of the laser beam, and
  means for lowering the intensity of the laser beam to decrese at least that portion of the laser beam intensity output that was emitted relative to any increase in the laser output resulting from the means for temperature compensation.

10. The apparatus of claim 9 wherein the means for compensating for temperature variations increases a driving current to the laser means for providing a laser beam.

11. The apparatus of claim 9 wherein the means for lowering the intensity of the laser beam includes an optical member having a transmission range of 60 to 20 percent of the incident laser beam intensity.

12. The appartus of claim 11 wherein the optical member is a mirror with low reflectance in the path of transmission of the laser beam.

13. The apparatus of claim 11 wherein the optical member is a neutral density filter.

14. An improved electrostatic latent image forming apparatus comprising:
  means for providing a laser beam;
  means for providing an image signal;
  drive means for adding bias current to a switching current modulated by the image signal and applying the current obtained by the addition to the laser means, thereby to excite the laser to emit the laser beam;
  a photoreceptor having a surface on which an electrostatic latent image is to be formed by the laser beam;
  an optical system for impacting the surface of the photoreceptor by the laser beam emitted from the laser means and forming an image by the laser beam on the surface of the photoreceptor, and
  optical means disposed in a path of transmission of the laser beam extending from the laser means to the photoreceptor for lowering the intensity of the laser beam, thereby to decrease a component of laser energy corresponding to the laser energy produced by the bias current.

* * * * *